Nov. 13, 1951 L. B. MAXWELL 2,574,794
MULTIPLE FRUIT PEELER AND SHREDDER
Filed June 7, 1949 5 Sheets-Sheet 1

INVENTOR.
Leoma Bradshaw Maxwell
BY
Charles M. Thomas
ATTORNEY

Nov. 13, 1951 L. B. MAXWELL 2,574,794
MULTIPLE FRUIT PEELER AND SHREDDER
Filed June 7, 1949 5 Sheets-Sheet 4
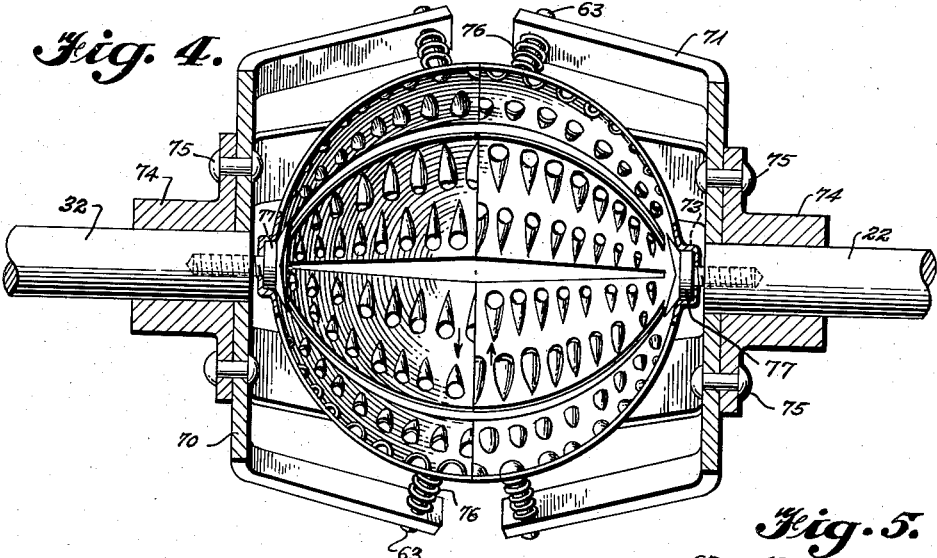
Fig. 4.
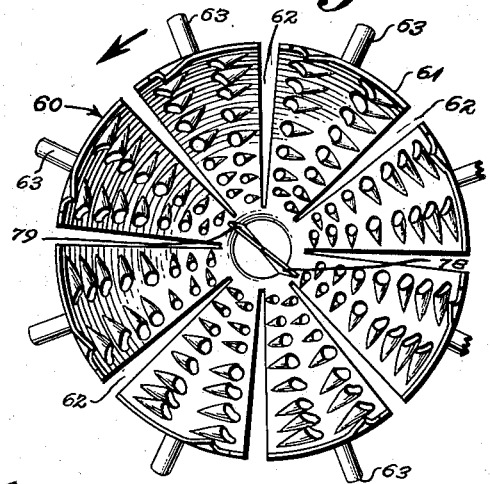
Fig. 5.
Fig. 6.
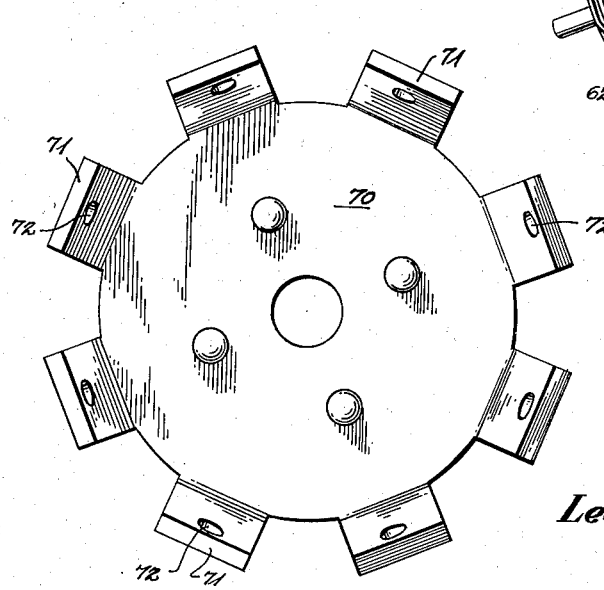
Fig. 7.
INVENTOR.
Leoma Bradshaw Maxwell
BY
Charles M. Thomas
ATTORNEY Nov. 13, 1951 L. B. MAXWELL 2,574,794
MULTIPLE FRUIT PEELER AND SHREDDER
Filed June 7, 1949 5 Sheets-Sheet 5
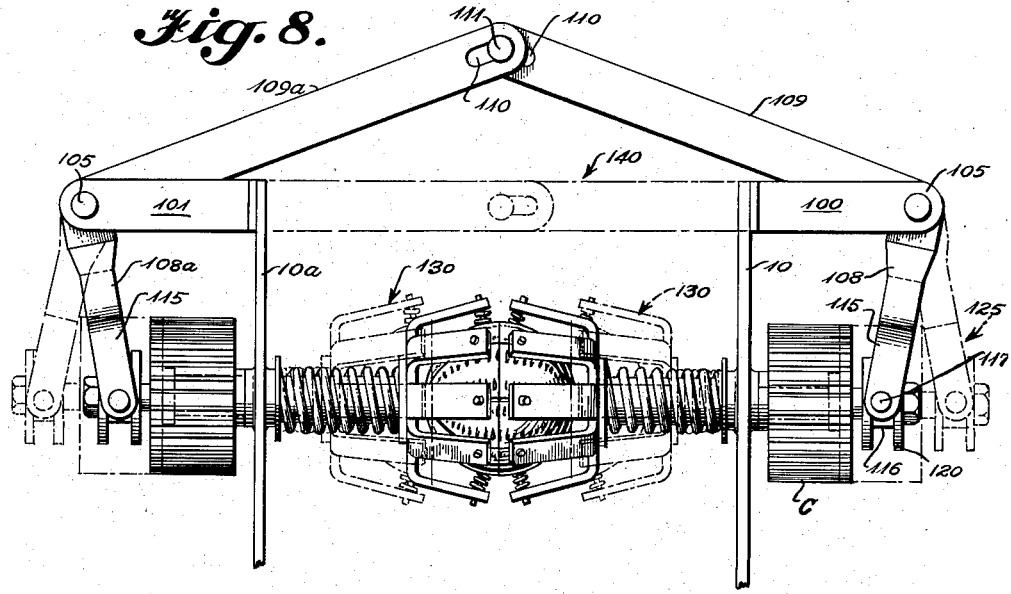
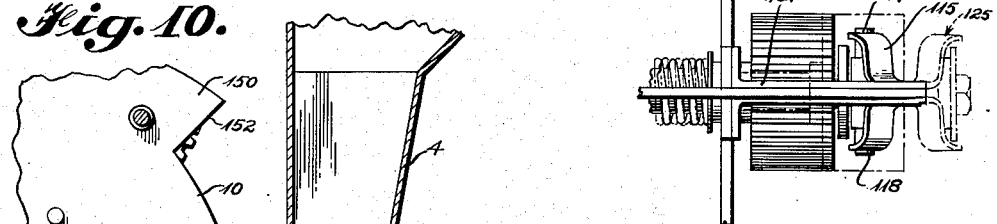
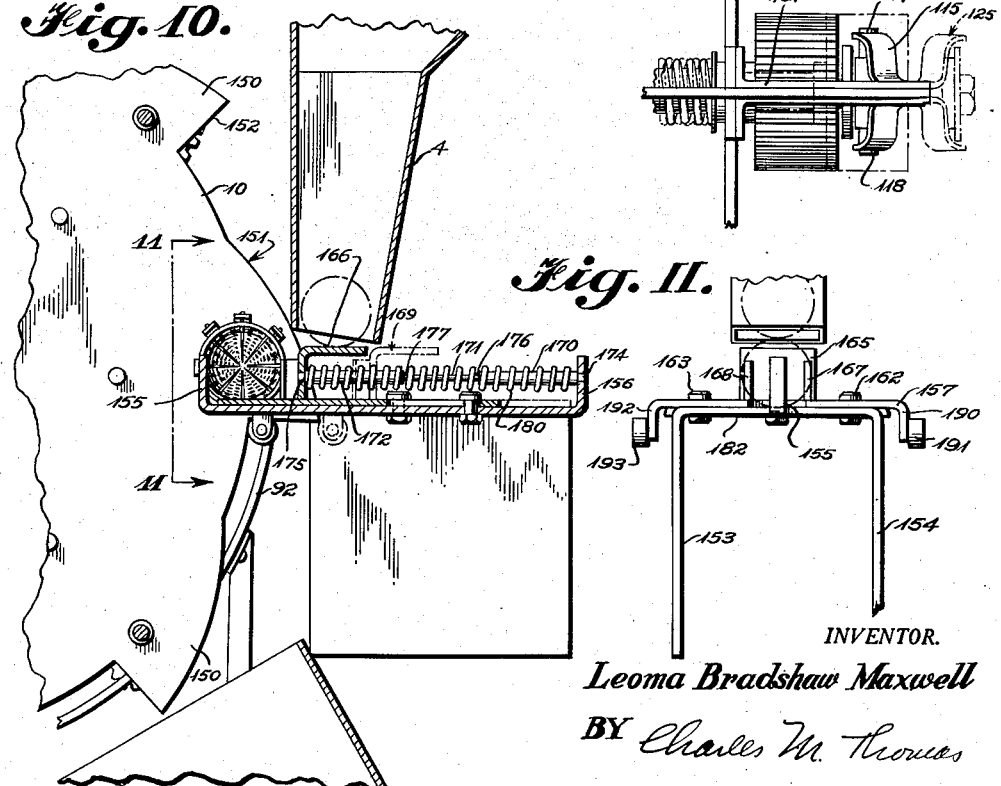
INVENTOR.
Leoma Bradshaw Maxwell
BY Charles M. Thomas
ATTORNEY Patented Nov. 13, 1951

2,574,794

UNITED STATES PATENT OFFICE 2,574,794

MULTIPLE FRUIT PEELER AND SHREDDER

Leoma B. Maxwell, Avon Park, Fla.

Application June 7, 1949, Serial No. 97,575

6 Claims. (Cl. 146—49)

This invention relates to a mechanism to peel and/or pare fruits of the citrus variety such as oranges, lemons, limes, grapefruit, etc., as well as, for instance, apples, plums and other related fruits. The machine is a wholly automatic mechanism which completely and efficiently removes the outer peel, as well as the entire outside membranes which are usually present next to the peel. It is so designed that the fruit need not be handled manually from the time the same is fed into the feed hopper until it is removed from the discharge bin containing the peeled fruit. The mechanism of this invention is so designed that the peelings or scrapings from the exterior of the fruit can be routed through common mechanical means to further apparatus for additional processing such as drying, the peelings being reduced to a fine shred suitable for further manufacturing processes.

Various methods have been utilized heretofore to accomplish the purposes of the present invention, but by and large, these methods or mechanisms have involved complex and expensive arrangements of parts, are usually difficult to operate, and generally have not obtained the desired processing wherein the peeling is completely and efficiently removed in an exceedingly short period of time. The simplicity of the mechanism of my invention readily adapts it to commercial fabrication with ease and with low cost.

It is an object of this invention to provide a mechanism and a method for peeling citrus fruits wherein it is unnecessary to pierce the fruit with some form of spike, impaler, or other implement to hold it in position for peeling, but wherein the fruit is peeled by two cups provided with cutting elements which are rotated in opposite directions to each other. The structures involved in the holding of the fruit utilized by my invention consist merely of hemispherical receptacles, provided with peeling blades, mounted in a floating and resilient fashion to permit them to exert a constant pressure against the outer surface of the fruit.

Another object of the invention is to provide a rotating turret fitted with the said peeling cups and arranged to automatically receive fruit from a suitable hopper at predetermined intervals such that the fruit is rapidly seized between the peeler cups, peeled during the rotation of the latter in the turret and automatically discharged into a suitable bin. At this same time peelings or shreds are emitted from the turret, and may be carried by a conveyor to an adjacent location for further processing.

An additional object of my invention is the provision of simplified cam mechanism which efficiently separates the peeler cups at predetermined intervals for reception of the fruit to be peeled, and a simplified feeder cam action which automatically and also predeterminedly charges the fruit into the separated cups when the latter are in open position.

A further objective and advantage of this invention is the design of mechanism relating to the peeler cups which permits various sized cups to be easily interchanged and a mechanism which utilizes cups of such design that they can accommodate various sized fruits, and will efficiently perform the peeling operation despite surface irregularities in the fruit. This objective is obtained through suspending the peeler cups in what might be termed a "floating" relationship with respect to their supporting elements, viz: The cups are supported on pronged members which permits the sections thereof to be resiliently mounted. There is no other unyielding support for these peeler units and hence they are flexibly supported, may be easily exchanged or replaced and hence are adaptable to various uses and various sized fruits. It is apparent that other objects and advantages of my invention will be recognized from the following detailed description of a preferred embodiment thereof as illustrated in the accompanying drawings.

In the drawings

Figure 4 is a sectional view of a pair of peeling units, indicating in detail the manner in which these units are mounted;

Figure 5 is an end view of one of the hemispherical peeling cuts showing the arrangement of the cutting elements;

Figure 6 is a detailed cross-sectional view of the arrangement of the cutting elements of each hemispherical peeling unit;

Figure 7 is an end view of one of the spider elements which support each hemispherical peeling unit;

Figure 8 is an elevation of a modified form of peeler cup separating mechanism;

Figure 9 is a top plan view of a detail of the separating mechanism shown in Figure 8;

Figure 10 is a sectional view of a feeder mechanism taken on line 10—10 of Figure 2;

Figure 11 is an elevation of the feeder mechanism taken on the line 11—11 of Figure 10;

Figure 12 is a detailed cross-sectional view of the clutch assembly adapted to prevent rotation when the peeler cups are separated.

In the preferred embodiment of my invention illustrated in the accompanying drawings as itemized in the foregoing, I have shown a continuous and completely automatic multiple fruit peeler and shredder and have indicated thereby apparatus which is suitable for carrying out the method comprising my invention.

Figure 1:
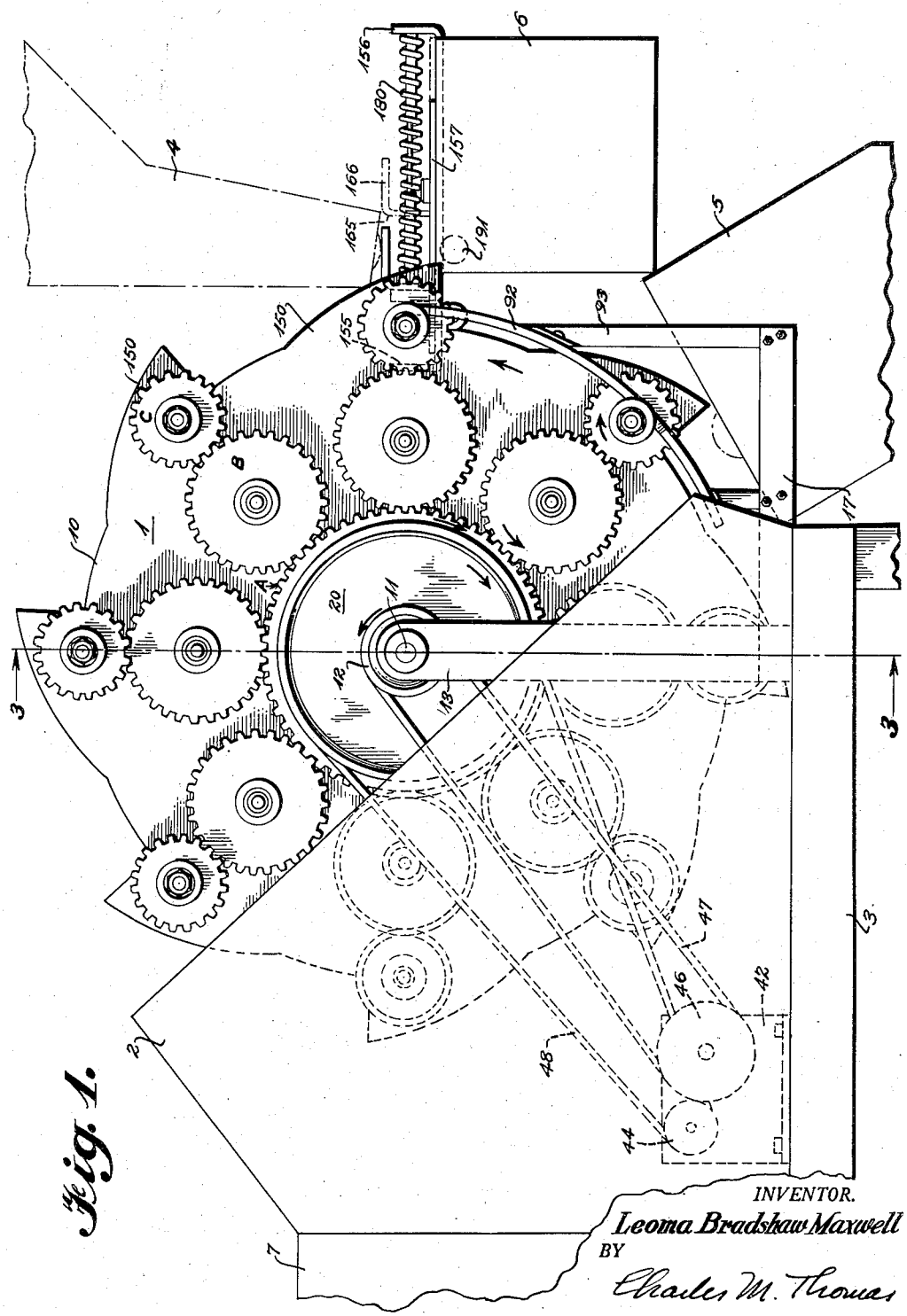
Figure 1 is a side elevation of the multiple fruit peeler and shredder embodying my invention.

Referring to Figure 1, it will be seen that the rotating turret hereinbefore referred to is generally indicated at 1. It comprises two generally circular elements 10 and 10a oppositely mounted upon a central shaft, and, to all practical purposes, identical in every respect. The whole turret may be entirely covered by a protective shielding, although in the embodiment illustrated, the shield 2 extends only partially over this rotating element. The turret is suitably mounted upon a table structure 3. A feed hopper 4 of common design is utilized to direct a plurality of oranges, apples, or similar fruit to the automatic feeder. Upon completion of the peeling operation the fruit is discharged through a bin 5 for storage or for such further processing as is necessary. The feeder element, which will be described hereinafter, is mounted upon an additional table or supporting structure 6.

Although not shown in this illustration of my invention, it is apparent that a suction conveyor system or vacuum process can be mounted underneath the table 3 in such fashion that the suction conveyor or vacuum will receive the shreds or peelings from the fruit and carry them to an adjacent position where they can be further processed by known methods. In such case, an appropriate shield for the conveyor can also be utilized and I have diagrammatically shown such at 7 in Figure 1.

Figure 3:
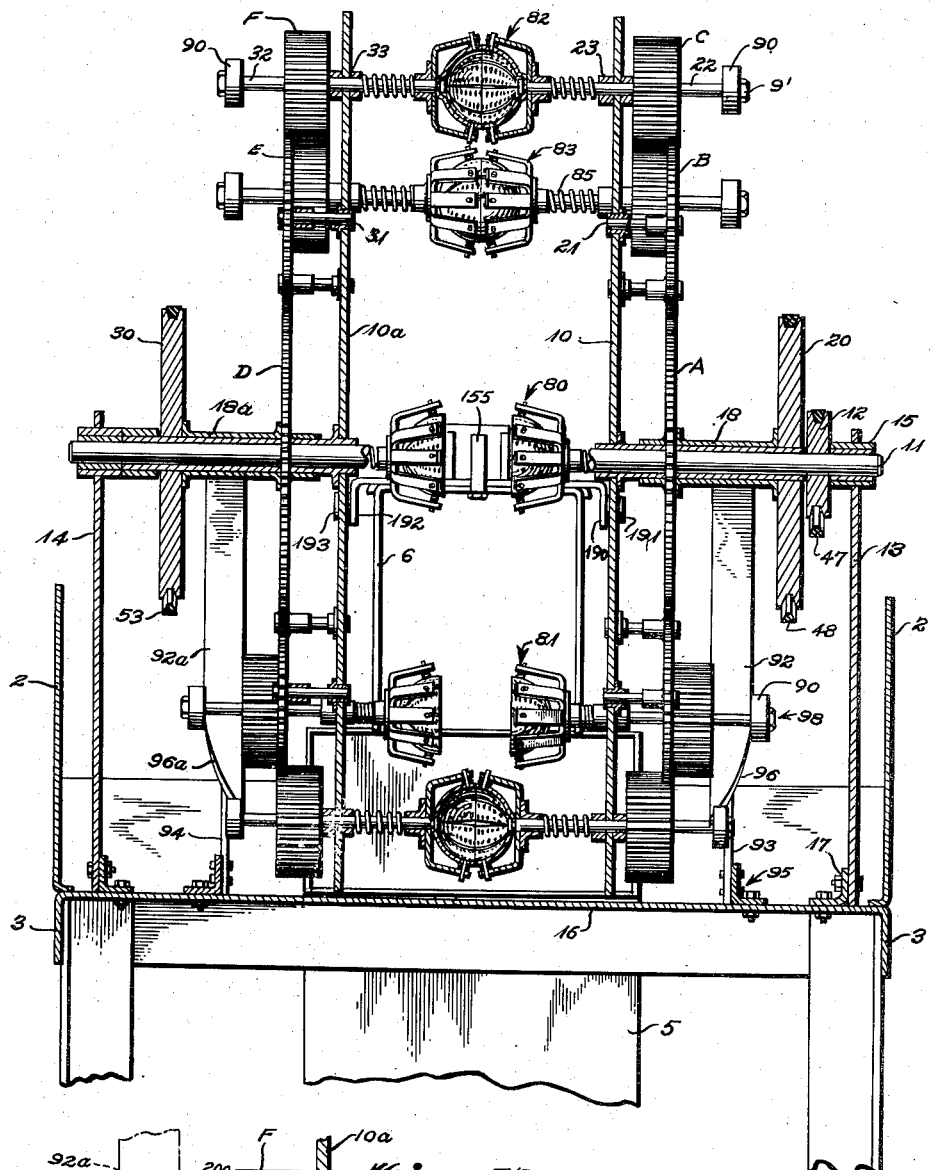
Figure 3 is a sectional view taken on the line 3—3 of Figure 1, exhibiting two of the peeler cups in their separated position.

The two main side elements of the rotatable turret, namely 10 and 10a, upon which the peeling mechanism and drive therefor are mounted, is positioned upon a shaft 11, which in turn has affixed thereto a suitable pulley 12, whereby the shaft 11 and turret may be driven in a counterclockwise direction. This shaft is rotatably supported at either end in brackets 13 and 14 which are fitted with suitable bearing members 15 as indicated in Figure 3. These brackets are of course in turn supported upon the table structure, being bolted to the latter's top surface 16 through suitable angle members such as that illustrated at 17.

Referring now more particularly to the various drive elements which are designed to rotate the turret in a counterclockwise direction, and also the separate halves of the peeling cups in opposite directions, it will be seen that the right hand cups, or those engaged with the spur gearing illustrated in Figure 1, are driven through a series of three pinion gears. The large and first gear A engages an intermediate spur gear B which in turn drives the spindle gear C, the latter being affixed to the shaft upon which the peeler cups are assembled, and thus constituting the drive for the latter. The gear A is mounted upon a suitable shaft 18 designed to rotate independently of shaft 11. The shaft 18 is driven through pulley 20 at a uniform rate of speed, preferably at lower revolutions per minute than the drive for the eight peeler cups shown.

The opposite side of the mechanism of the turret which I have just described is exactly the same in every detail, except that there is no drive for shaft 11. As will be seen from an inspection of Figure 3, the main, intermediate and spindle gears, D, E, and F, bears a corresponding relationship to the gearing I have already referred to. Similarly, the shafting for each set of gears on either side of the turret is the same. For instance, gear D is mounted upon the same type of shaft 18a which will permit its rotation independently of the rotation of shaft 11. Intermediate spur gears B and E are mounted upon fixed shafts such as those indicated at 21 and 31 and the two spindle gears C and F are mounted upon opposite shafts 22 and 32. Suitable bearings 23 and 33 for shafts 22 and 32 must of be course be provided. The drive for the individual peeling cups on the left of the mechanism corresponds to the pulley 20 and is indicated at 30.

In the embodiment of the invention illustrated, it should be noted that the spindle gear C and F, and all other gears corresponding thereto which directly drive the individual peeler cups, are designed with teeth of relatively great width. For instance, these spindle gears as here shown are approximately four times the width of teeth such as those found upon intermediate gears A, B, D and E. This increased width of the spindle gears permits them to move horizontally upon their respective shafting but at the same time to remain engaged with such intermediate gearing. Thus, when the cups are moved outwardly or opened, and the corresponding spindle gears are also moved outwardly by suitable cam action which will be described hereinafter, the said spindle gears do not become disengaged with their complementary intermediate gearing, as for instance, B and E.

Figure 2:
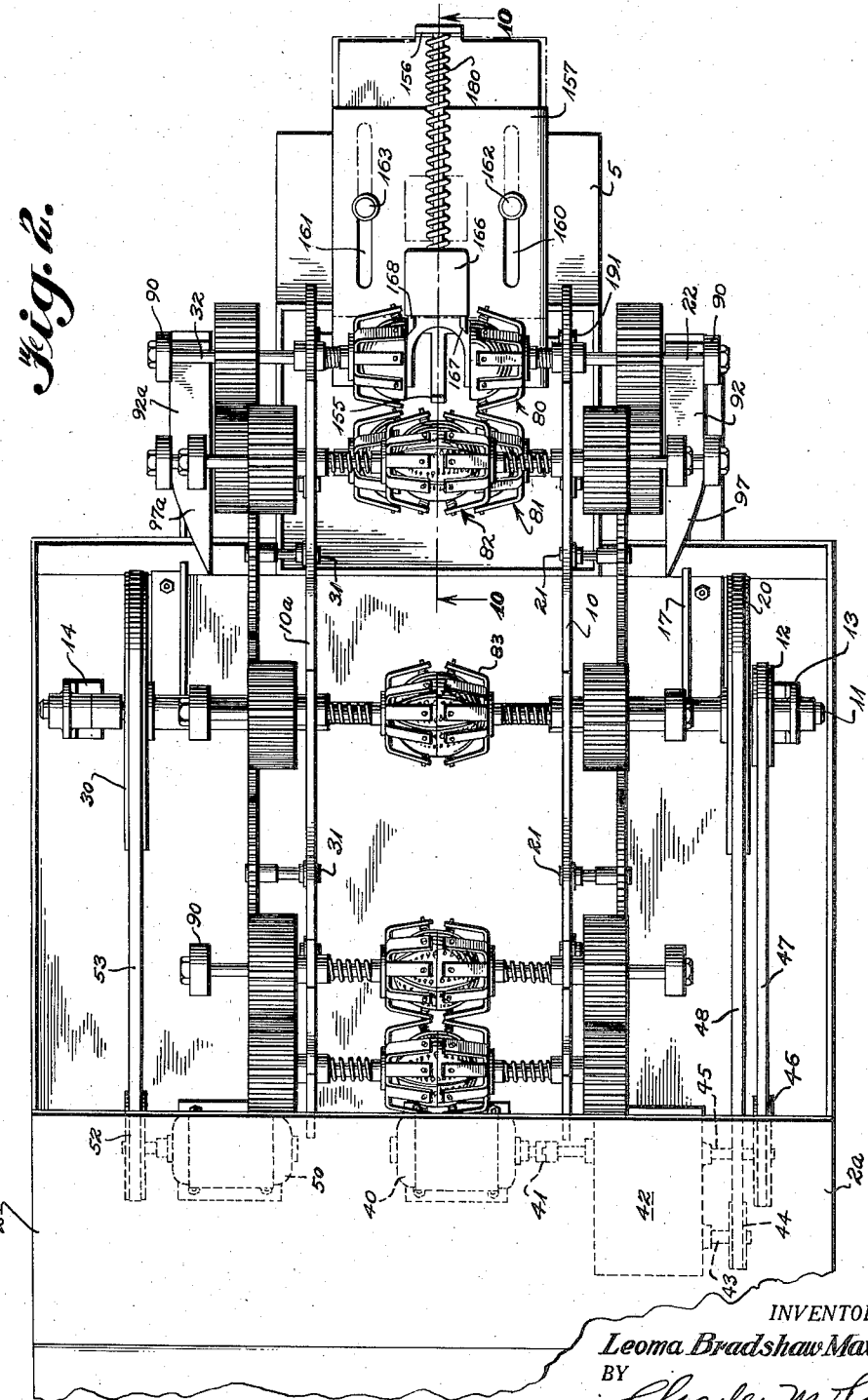
Figure 2 is a top plan view of the invention illustrated in Figure 1.

Any desired arrangement of motors or propelling force can be utilized to drive, firstly, the turret upon which the peeler cup assemblies are mounted, and secondly, the respective peeler cups in opposite or counter-rotating directions. However, I have found it desirable to employ two individual electric motors for this purpose. These are indicated in dotted lines at 40 and 50 in Figure 2. Motor 40 is interconnected through a suitable coupling 41 to a gear box 42 designed to transmit speed of different rates to the shafts 43 and 45. Thus, shaft 43, driving the main turret, is designed to propel the turret at a relatively low rate of speed and shaft 45, designed to rotate the right hand set of peeler cups, will revolve at a comparatively higher rate of speed. The relative rate of speed of each shaft can be controlled by appropriate speed reduction mechanism well known in the art. These two shafts, 43 and 45, are connected through complementary pulleys 44 and 46 and the usual belting 47 and 48 to drive the gear mechanism which has already been described.

Although it is conceivable that the motor 40 can be provided with shafting on both ends or otherwise fitted so that suitable gearing could also drive the mechanism for rotating the left hand peeler cup assemblies, I have found that the use of an additional motor 50 is more desirable. The latter motor may be directly connected to the left peeler cup assembly through the usual pulley 52 and belting 53, and if desired, motor 50 may also be furnished with speed reduction mechanism of known types.

From the foregoing it is apparent that whereas the turret itself continuously rotates in one direction, namely in a counterclockwise direction as indicated by the arrows in Figure 1, the respective peeler cups, through the arrangement of parts recited, are designed to rotate in opposite directions to each other. In other words, in the modification herein described, the peeler cups viewed from the right hand side as in Figures 1 and 3, will be rotated through motor 40 in a clockwise direction during the peeling operation and the peeler hemispheres on the left hand or opposite side of the assembly will be rotated in an opposite direction by motor 50.

The peeler cup assembly is more particularly shown in Figures 4 to 7 inclusive. It comprises a hemisphere 60 divided into a number of segments and, as clearly illustrated in Figure 5, may consist of eight such segments. It is apparent that any desired number of segments may be utilized but I have found that cups made with either 4, 6 or 8 segments are more practical and desirable from a commercial standpoint. Factors such as the size of the fruit to be peeled, or the type of skin thereof, should determine the desirable number of such segments. These segments are, of course, separated by an intervening space or channel 62. They are preferably made of a material of resilient or spring-like quality such as spring steel and are of such thickness that, consistent with durability and strength, their shape can be modified slightly in a manner which will later be described. Each hemisphere or peeler cup is provided with eight projections or prongs 63, or one for each segment used, each of which is mounted at a midpoint of each section and toward the inner periphery of the cup. Each section is also provided with a series of cutter blades. These cutter blades can be mounted or constructed upon the individual edges of each section or they may be formed at the midline of each section. Alternatively, they can take almost any desired shape, such as being square in cross-section or round or oval. A desirable form of cutter blade is shown in more detail in Figure 6 wherein the cutter edge 65 is formed to terminate downwardly from the circumference of the hemisphere, the cup being dished as at 66 to aid in expelling the peelings at high speeds of rotation.

The arrangement of cutter blades shown in Figures 4, 5 and 6 is optional but is illustrated as a preferred form of arrangement that will efficiently peel various types of fruits. These cutting elements 65 are formed in each hemisphere and made in exactly the same manner. When one is turned to face the other, it is then the opposite, making one right hand and the other left hand; and such that when rotated in opposite directions the cutting edges also move in opposite directions. The elements are similar to graters or shredders and formed by cutting round apertures in the metal of each segment and pressing an indenture next to the cutting edge at about 30° angle to the circumferential edge of each hemisphere. The apertures so formed might be square with a square tapering indenture producing a flat cutting edge; or oblong with a sharp crimped edge tapering outwardly. Additionally, long curved blades of proper dimensions can be affixed to the segment in a suitable manner adjacent the apertures. The edge of the cutting element is, of course, sharpened suitably so as to perform the described functions. The cutting elements represented in Figures 5 and 6 are interchangeable and may be mounted upon either side of the machine when viewed as in Figure 3.

To assure a smoothly peeled surface, it has been found that two rows of cutters can be formed in each segment of each hemisphere as shown in Figure 6, the second row of cutters 67 being staggered with relation to the leading cutters 65 in order that the entire surface of the fruit will come into contact with a cutting element. The leading cutters are placed at or near the outer edge of each segment so that the leading cutters of each hemisphere will be adjacent to each other when the cups are in closed position, thereby insuring peeling of the entire fruit. As shown in Figure 5, the arrangement of cutting elements in two rows is such as to leave space therebetween for the mounting of the prong 63 and its related apparatus.

The type of cutting edge utilized will determine the condition in which the peel comes off the fruit. Small apertures formed adjacent small indentures will obviously produce small shreds; larger apertures with deeper indentures will produce larger shreds or strips of peel, and a blade with an even deeper "bite" will produce a ribbon strip of peel.

These peeler cups or hemispherical units are each mounted in what might be termed a "floating" manner. They are at no point rigidly fixed to any part of the spider element but are, on the contrary, subject to flexing due to reception of different sized fruit or to a variance in the manner in which they are mounted. This floating mount is obtained by insertion of the prong 63 in an element or spider 70 which is fitted with projections 71, each of which is in turn provided with an opening 72. The prongs 63 can be inserted through the aforesaid openings with ease to permit interchangeability of the cup members. The circular member 70 to which I have referred is affixed to drive shaft 22 in any suitable manner such as by riveting the same by rivet 75 to collar 74 and mounting the latter by splining the same or welding it, to the aforesaid shaft 22. Rotation of the shafts 22 and 32, both of which are fitted with the projections 63, and the spider elements 71, will propel each cup in a direction opposite to its complementary cup. In the position shown in Figure 4, these cups, when in closed position with fruit therebetween, are located directly opposite to each other and in such manner that they form an approximate sphere, completely surrounding the fruit to be peeled, thereby eliminating the necessity of handling the fruit by some other media to perform the peeling operation, such as by piercing the fruit with a spike, impaler or similar device to maintain its position secure during removal of the skin or rind.

It is desirable that each peeler cup be so mounted and constructed that the inner surface thereof, or the sides from which the cutter blades project, exert a constant and uniform pressure upon the surface of the fruit to be peeled. This objective is partially accomplished by construction of the cups of a resilient and spring-like material, but, in addition, a helical tension spring 76 is placed on each of the prongs 63 and positioned intermediate each section of the several cups and each spider arm 71, as will be seen by reference to Figure 4. These springs 76 can be designed of such size and strength that when utilized as shown they will exert a constant pressure toward the fruit, exerted through each section of each of the cups. Hence, irregularities in the skin of various fruits, as well as irregularities in the size thereof, may be compensated for by this combination of resilient shredder cups divided into segments, each segment of which is backed by a resilient spring means.

Each hemisphere or peeler cup is also additionally supported by a screw 77 threaded into the appropriate axis 22 and 32 as the case may be. In order that the said screw may be provided at its head with a cutting element, it may be fitted into an appropriate depression 73 as shown in Figure 4. The head of screw 77 preferably has formed thereon blades 78 and 79 which are of sufficient size to overlap or at least meet the cutting elements on each of the segments nearest the axis of the shredder cup. When so mounted, the blades 78 and 79 assure peeling of the fruit at its axial center or at the portion thereof which would not ordinarily be reached by the cutting elements in the various segments which I have heretofore described.

These screws 77 may be adjusted in such manner to enable certain adjustments of each cutting hemisphere by screwing them in or out of their respective shafts with which they are in threaded engagement. The interior contour of the segments may be changed and therefore, to some extent the "bite" of the cutter blades upon these various segments. These adjusting screws 77 further permit the operator to vary the distance between peeler cups when the same are in their normal "closed" position to carry out the shredding operation. This adjustment is facilitated by the manner of mounting the shredder cups already described: The pronged element 63 and the springs 76 permitting a certain amount of free movement of the peeler cups, which movement will be effected in the manner described by the positioning, at the will of the operator, of adjusting screw 77.

Reference is now made to the cam action which opens and closes the pairs of peeler cups in such manner that the same are open to receive fruit during one portion of the cycle of the turret and are closed during the remaining portion of the cycle at which time the fruit is being peeled. The relative positions of the pairs of cups, both during peeling, and when opened to receive fruit, are clearly indicated in Figure 3. Here open cups which are separated to receive the fruit at a predetermined interval are indicated generally at 80 and 81; and shredder cups which are closed and engaged in the actual peeling operation are generally designated at 82 and 83. Normally, these hemispheres will be positioned together as in the latter instance by the exertion of a suitable spring 85 mounted upon each of their respective drive shafts and positioned between each cup and the respective side 10 or 10a of the turret. As shown, these springs bear, at their outer extremity, upon bearings 23 and 33 in which the peeler cup shafts are mounted. Such springs must, of course, be designed in such manner that the cups will be held together with sufficient force to successfully carry out the peeling operation, yet should not exert such thrust that the clutch operation or cup separating mechanism would be unduly retarded. Each of the shafts upon which these shredder or peeler devices are mounted, such as the ones indicated at 22 and 32, is provided with a roller 90 which may or may not be firmly affixed to the said shaft 22. When the clutch device illustrated in Figure 12, to be hereinafter described, is utilized as a component part of this mechanism, then the collars 90 will be mounted to turn with each of the shafts 22. Such collars are, of course, provided with retention means to maintain them upon the drive shafts such as end bolts 91 or other suitable means well known in the art. The collars 90 are adapted to engage two cams 92 and 92a which are located at such a position that during a portion of the cycle or rotation of the turret these collars will engage the cams and be forced outwardly with respect to the midline of the turret. I have shown the cup separating control cams as resting upon and affixed to the table structure 16 by means of appropriate brackets 93 and 94, fastened to the said structure in any usual manner such as by suitable angle elements 95. Each cam is provided with a taper 96 and 96a at each of its terminal ends. The taper just referred to enables the element 90 to be picked up along the said taper and gradually forced outwardly to its final position generally indicated at 98. Upon the completion of the operation of opening the hemispheres the elements 90, the gearing C and F and associated mechanism, resume their original positions by thrust of the several springs 85, gradually being allowed to return to position over the tapers 97 and 97a at the opposite end of each cam. From the foregoing it will be seen that a simple expedient is here utilized to open and close the peeler cups at designated and predetermined intervals. This can be accomplished with split-second timing such that the feeder mechanism does not interfere with the closing of the cups immediately prior to, as well as after, the fruit has been charged between each pair of shredder units.

As an alternative mechanism for separating the cups, I have disclosed an additional method by which this might be accomplished. Referring to Figure 8, the two sides 10 and 10a of the turret are provided with pairs of transverse arms 100 and 101 located immediately above the center axis of the several drive shafts to each cup. These arms provide a bearing support 105 upon which is suspended a rocker arm made in one section but provided with two legs 108 and 109, the latter being of sufficient length to engage its counterpart upon the opposite side of the turret 109a. The longer leg has a slot 110 adapted to receive a sliding bolt 111, and the shorter length of such rocker arm terminates in a fork 115. This fork is affixed to a sliding collar 116 by means of bolts, screws or other common media 117 and 118. The collar 116 is in turn slidably or rotatably positioned upon a grooved wheel or pulley 120. The cams I have referred to, such as 92 and 92a, can be so designed, within the skill of the art, that they provide a trackway in which the grooved pulley 120 can ride during the time it is forced outwardly to open the cups. Alternatively, such cams may be devised to ride between the gear C and the inner side of the pulley 120. In any event, it is apparent that when the cam forces the pulley and its accompanying mechanism outwardly as shown at 125, the longer arms 109 and 109a, will assume a horizontal position with respect to the turret as generally indicated at 140. In this position the complementary spiders and associated shredder cups are forced apart to the relative positions generally indicated at 130. This combination of elements which has just been referred to also definitely limits the amount of separation of the cups and positively assures their return to a peeling position at a time predetermined by the setting or arrangement of the aforesaid cams 92 and 92a. It can be readily appreciated that if continuous cams were provided, that is, throughout 360°, they could be so arranged as to not only provide a trackway for pulley 120 to ride upon, but to control both the outward as well as inward movement of the shredder cups. If so designed, the trackway enabling reciprocation of the peeler cups in both directions, spring means 85, if desired, can be dispensed with.

I have heretofore referred to means for automatically feeding fruit from a suitable hopper 4 to the turret and between the shredder cups at the desired interval. This feeder mechanism is motivated by intermittent contact with cams 150 as the turret rotates in a counterclockwise direction. These cams 150, take the form of projections upon the periphery of each turret side 10 and 10a. That side of each cam adapted to initially engage the feeder assembly so as to force it backwardly is curved as at 151. The opposite side of each cam terminates abruptly or on a line extending right angularly to, or radially of the center axis of the turret, as shown in Figure 1. Such cams are adapted to reciprocate the feeder assembly in a manner now to be described. The feeder assembly is mounted upon a suitable base 182 raised to the desired height by legs 153 and 154. Integral with the base 182 is fabricated a forward projecting finger or arm 155 extending vertically to the said base and designed as a stop for fruit which is charged into the turret by the feeder assembly. The base at its opposite end also has an upwardly extending plate member 156 designed to maintain one end of the feeder spring in position. The feeder itself comprises a sliding element 157 which has two slots 160 and 161 along opposite sides thereof and in parallel relationship with respect to each other adapted to slidably engage bolts or projections 162 and 163. Near its forward end or toward the turret, the sliding plate 157 has a vertical plate member 165 terminating in a horizontal fruit support 166. This forward plate 165 is also fitted with extending projections 167 and 168 spaced apart so as to partially surround an orange, for example, and hold it in a suitable and firm position for feeding it into the shredder cups. Normally, the fruit support and accompanying sliding mechanism will be located in an extended position or as shown in Figure 10. This position is maintained by a helical spring 180 which encircles a sliding assembly attached at one end to the forward plate 165 and at the opposite end to the rear plate 156. For instance, this sliding assembly may consist of a rod 170, approximately one-half of which is of reduced diameter as at 171, the reduced portion of the rod being adapted to fit in piston-like fashion into a complementary rod 172 having a suitable bore to receive element 171. Rod 170 is affixed as at 174 to the rear plate in any suitable manner such as by welding or threaded engagement with said rear plate. The tubing or rod 172 is similarly affixed to the forward plate 165 as indicated at 175. The extent which the fruit support 166 and its related mechanism may be collapsed is limited by the appropriate bearing surface or collars 176 and 177 which, when adjacent and bearing against each other, prevent additional retraction of the feeder asssembly. Retraction beyond a desired point is also prevented by making slots 160 and 161 of the desired length, and also is limited by the distance each cam 150 projects from the periphery of the turret sides 10 and 10a.

In order that this assembly can be rapidly reciprocated in a manner which will assure its feeding fruit into the shredder cups at desirable intervals, bearing surfaces are provided which engage the cams 150 on the turret at desired intervals. Referring to Figure 11, it will be seen that the forward section of the sliding plate is provided with two downwardly extending dogs or projections 190 and 192. Rollers 191 and 193 are mounted in each dog. The latter ride upon the circumferential edges of each side plate 10 and 10a of the turret. In the latter's counterclockwise rotation, these rollers will engage the several cams 150 which will force the said rollers out from the turret and back into the position shown at 169. In this latter position, a single fruit such as an orange is permitted to drop downwardly between the forward plate 165 and the two retaining members 167 and 168 and will be held there until the rollers reach the end of the cam surface 151. At this time the forward plate 165 ejects the fruit into the shredder cups and the top plate 166 retains the remaining fruit in the hopper in the position indicated. This operation can take place with great rapidity, the sliding mechanism of the feeding device being so adjusted that the injection of the fruit into the separated hemispheres will not interfere with the continued counterclockwise rotation of the latter upon the turret. I have found that this type of feeder is far less complex than the multiple and expensive devices heretofore used to periodically charge fruit or other objects into a plant processing machine and that it efficiently performs the functions for which designed.

In the foregoing I have briefly referred to the desirability of utilizing some form of clutch mechanism to stop the rotation in opposite directions of the several peeler cups at that time in their cycle when they are open to receive the fruit. This is highly desirable for several reasons: Rotation at relatively high speeds after the fruit has been discharged from the peeler units will naturally tend to disseminate haphazardly the fine shreds remaining in the peeler units over the machine and over operating personnel and, also, it is far less difficult to charge fruit into these peeler assemblies when the same are stationary rather than when rotating at relatively high speeds when there might be some chance of fruit being damaged or being unduly tossed about before they are properly centered within the shredder units.

The clutch I have designed is particularly well adapted to the purposes mentioned. It comprises a clutch spring 200, which is merely a helical spring, having one end 201 bent to a position horizontal to the axis of the drive shaft and firmly secured to the spindle gear which forms the main drive of one hemisphere to the shredder assembly. The opposite end of the spring is provided with a hook 202, and when the clutch is engaged so that the peeler assemblies are rotating, this hook portion partially encircles a suitable pin 203, the latter being affixed to the collar 204 of the usual element 205, comparable to the element 90 hereinbefore described, which rides upon the cams 92 and 92a to open and close the cup assemblies. The clutch disclosed in Figure 12 would be one adapted for use upon the left side of the turret or in conjunction with the gearing F and as shown in that figure, the clutch is pictured as engaged. In other words, through the spring assembly the gearing F rotates the collar 204 and this being firmly splined or press fitted to the shaft 32, the latter is also caused to rotate. When, however, the element 205 engages the cam as indicated in dotted line at 300, that element is moved outwardly with respect to the turret and the helical spring is disengaged from the pin 203. When utilizing this form of clutch the spindle gear F is freely mounted upon the drive shaft 32 and when the spring is disengaged, as described, no drive is imparted to the shaft so that the cups are stationary at the same time that they are opened to receive fruit from the feeder mechanism.

From the foregoing description the operation of the machine comprising my invention should be apparent. Briefly summarized, the operation may be described as follows:

Fruit is charged into the hopper 4 which sorts the same to emit one orange, for instance, at a time. The fruit is maintained in the hopper by the feeder mechanism until rotation of the turret causes the feeder mechanism to slide backwardly at which time the orange assumes a position in front of the forward feeder plate. As the turret continues to rotate in a counterclockwise direction, the feeder mechanism is permitted to rapidly move forwardly, placing the fruit in a position to be picked up by the two peeler cups. At that time these opposed hemispheres are in their open position and are also stationary, i. e., they are not rotating in counter-directions to each other. After the fruit has been placed in a position for retention by the peeler units, continued rotation of the turret will cause these units to close and cam 92, through the combination of elements described, permits these units to rotate in opposite directions to each other at relatively high speed. Thus, during the major part of the cycle of the turret, the peeling operation takes place, wherein the cutter blades of each cup remove the skin of the orange down to a point where the latter is ready for slicing or juicing. During this major portion of the cycle which may occupy approximately 300° of the rotation of the turret, the peeling operation continues but ceases when cams 92 and 92a are again engaged as shown in Figure 1. At this time the peeling units engaging the said cams become separated, permitting the fruit to be discharged into the trough 5. At this time the counter-rotation of these units has again ceased due to clutching out of the spindle gears as hereinbefore described. As I have already inferred, during this approximately 300° cycle of rotation of the turret, while the peeling operation continues, it is apparent that the shreds or peels from the fruit will drop down between the two side walls 10 and 10a of the turret upon the support 16. Although not shown, it is obvious that this support can be perforated or slotted or provided with such appropriate openings that these peelings will be discharged therethrough. A suitable suction conveyor or vacuum may be positioned underneath the said support to remove the peelings and shreds to a location where further processing of the same can be done.

It is obvious that many changes can be incorporated into the embodiment of the invention that I have described without departing from the spirit thereof. Such departures may involve the use of belting as the sole means of drive of the various main, intermediate and spindle gears. The particular type of cam arrangement for separation and for control of rotation of these cup units is only one example of how an element of this type can be designed.

From the foregoing description it will be seen that I have provided a unique peeling and shredding device wherein rotation of two peeler cup units in opposite directions eliminates the necessity of spindling or spiking the fruit by some form of impaler to maintain it in position. The use of the described feeder assembly permits automatic opening and closing of the peeler cup units at predetermined intervals. The "floating" mount by which these peeler assemblies are maintained in position during their cycle of operation, such enabling the operator to interchange the size of the cups, and consequently, the blades with which these cups are provided, lend diversity to the machine, and permit its use upon a wide variety of objects. The simple cam mechanisms disclosed permit precision control of three separate functions: Counter-rotation of the peeler assemblies at predetermined times, opening and closing the same at timed intervals, and automatic feeding of fruit into the turret.

I claim:

1. In a fruit peeling machine having a rotating turret provided with hemispherical peeling units mounted on counter-rotating shafts and adapted to peel fruit placed between said units, means to separate said units for the reception of fruit therebetween comprising bearing units positioned on opposite sides of said turret and in axial alignment with said shafts, a rocker arm supported in each of said bearing units, one end of said arm being slotted for sliding engagement with its complementary arm, and the opposite end being mounted on said shafts to reciprocate therewith, cams located adjacent the outer periphery of each side of said turret, said cams being adapted to reciprocate said arms by engagement with said sliding collars, whereby said shafts and said units are periodically forced apart to receive and discharge fruit.

2. In a fruit peeling machine having a rotating turret provided with hemispherical peeling units mounted on separate counter-rotating shafts, and adapted to peel fruit placed between said units, means to separate said units for the reception and discharge of fruit, said means comprising bearing members positioned on opposite sides of said turret and in parallel relationship with said shafts, oppositely mounted angular rocker arms supported in each of said bearing units, each of said arms being slotted at one end for sliding engagement with its opposite arm, the opposite ends of said arms having cam engaging means, and means to reciprocate said shafts when said arms are rotated on said bearing, circular cams on opposite sides of said turret to engage said cam engaging means, whereby said arms may be rotated and said shafts and peeling units moved horizontally with respect to each other.

3. In a fruit peeling machine having a rotating turret provided with peeling units mounted on counter-rotating shafts and adapted to periodically separate to receive fruit, each of said units having resilient segments, means for mounting said units in said turret comprising projections upon each of said segments, a spider element with arms superimposed about the periphery of each of said units, said spider element being affixed to said shafts, the arms of said spider elements having apertures to receive said projections, and spring means between each of said segments and said arms whereby said units are positioned in floating and adjustable relationship with respect to each other.

4. In a fruit peeling machine having a rotatable turret and provided with hemispherical peeling units mounted on counter-rotating shafts and adapted to periodically separate to receive fruit, each of said units having segments, of resilient and spring-like material, means for mounting said units in said turrent comprising projections on each of said segments, a spider element on each of said shafts having a plurality of arms arranged to surround said segments and in spaced relation thereto, said arms having apertures adapted to receive said projections, and a spring means mounted on said projections between said segments and said arms, said spring means being adapted to urge said segments of each unit inwardly toward each other, whereby said units are mounted in a floating manner and enable peeling of said fruit despite irregularities on the surface thereof.

5. A fruit peeling machine comprising a rotating turret, hemispherical peeler units in said turret adapted to open and close and to receive fruit to be peeled therebetween, said units being comprised of resilient arcuate segments having cutter blades on the inner surface thereof, said segments being mounted on shafts adapted for counter-rotation, cam engaging means to open and close said units, means for mounting said units in adjustable and floating fashion comprising projections on said segments near the point of widest diameter of said units, spider elements on said shafts provided with apertures to receive said projections, spring means on said projections between said segments and said spider elements for exertion of inward pressure, a slidable carriage for injecting fruit in said turret and cam means on said turret to actuate said carriage when said units are in open position.

6. In a fruit peeling machine having a rotating turret with hemispherical peeling units oppositely mounted on separate counter-rotating shafts, means for mounting said units in floating and adjustable relationship with respect to each other comprising projections on each of said segments, spider elements having arms affixed to said shafts and provided with apertures to receive said projections, and means to open and close said units comprising an angular rocker arm oppositely positioned for rotation on each side of said turret, said arms being slidably engaged with each other at one end thereof and engaged at the opposite ends thereof with said shafts, whereby said shafts and said units are separated when said arms are rotated, means for mounting said units in floating and adjustable relationship with respect to each other comprising projections on each of said segments, spider elements having arms affixed to said shafts and provided with apertures to receive said projections, a slidable carriage for injecting fruit in said turret and cam means on said turret to actuate said carriage when said units are in open position.

LEOMA B. MAXWELL.

REFERENCES CITED

The following references are of record in the file of this patent:

UNITED STATES PATENTS

| Number | Name | Date |
| --- | --- | --- |
| 990,449 | Milhado | Apr. 25, 1911 |
| 1,197,569 | Woodland | Sept. 5, 1916 |
| 1,467,616 | Forry | Sept. 11, 1923 |
| 1,483,676 | Petersen | Feb. 12, 1924 |
| 1,841,239 | Caverly | Jan. 12, 1932 |
| 2,030,182 | Richards et al. | Feb. 11, 1936 |
| 2,166,883 | Wehr | July 18, 1939 |
| 2,205,059 | Clark | June 18, 1940 |
| 2,264,361 | Chapman | Dec. 2, 1941 |